United States Patent [19]
Kim

[11] Patent Number: 6,128,117
[45] Date of Patent: Oct. 3, 2000

[54] COMPUTER SYSTEM PROVIDED WITH INFRARED COMMUNICATION CABLE

[75] Inventor: Ji-Sang Kim, Kyunggi-do, Rep. of Korea

[73] Assignee: SamSung Electronics Co., Ltd., Kyungki-do, Rep. of Korea

[21] Appl. No.: 09/058,557

[22] Filed: Apr. 13, 1998

[30] Foreign Application Priority Data

Apr. 15, 1997 [KR] Rep. of Korea ................. 97/13724

[51] Int. Cl.[7] .................................................. H04B 10/00
[52] U.S. Cl. ........................... 359/152; 359/172; 710/64
[58] Field of Search ................................ 359/152, 142, 359/163, 172; 710/64; 340/825–72; 370/277, 310; 455/151.2

[56] References Cited

U.S. PATENT DOCUMENTS

| | | | |
|---|---|---|---|
| 5,099,346 | 3/1992 | Lee et al. ........................... | 359/118 |
| 5,247,380 | 9/1993 | Lee et al. ........................... | 359/118 |
| 5,309,564 | 5/1994 | Bradley et al. .................... | 395/200 |
| 5,343,319 | 8/1994 | Moore ............................... | 359/152 |
| 5,416,627 | 5/1995 | Wilmoth ............................ | 359/159 |
| 5,564,020 | 10/1996 | Rossi ................................ | 395/200.15 |
| 5,600,471 | 2/1997 | Hirohashi et al. ................. | 359/152 |
| 5,636,264 | 6/1997 | Sulavuori et al. ................. | 379/56 |
| 5,668,654 | 9/1997 | Benjamin et al. ................. | 359/152 |
| 5,668,977 | 9/1997 | Swanstorom et al. ............ | 395/500 |
| 5,682,379 | 10/1997 | Mahany et al. ................... | 370/311 |
| 5,715,077 | 2/1998 | Lahti et al. ....................... | 359/152 |
| 5,861,969 | 1/1999 | Yasuda .............................. | 359/152 |
| 5,864,708 | 1/1999 | Croft et al. ....................... | 359/152 |
| 5,982,520 | 11/1999 | Weiser et al. .................... | 359/172 |
| 6,064,502 | 5/2000 | Burns ................................ | 359/152 |

*Primary Examiner*—Kinfe-Michael Negash
*Attorney, Agent, or Firm*—Robert E. Bushnell, Esq.

[57] ABSTRACT

A computer system includes an input adapter and an external optical communication transceiver. The adapter has a plug which can be mated with the keyboard socket and a duplicated keyboard socket for allowing an input device such as a keyboard to be electrically connected with the system unit. The external optical communication transceiver is electrically connected with an optical point-to-point communication controller through the adapter. The optical communication transceiver and the adapter can be electrically connected with each other by either an extension cable or a flexible tube, thereby the computer system and other infrared-equipped devices can be aligned for user convenience's sake regardless of allowable link angle and distance.

20 Claims, 10 Drawing Sheets

COMPUTER SYSTEM PROVIDED WITH INFRARED COMMUNICATION CABLE

CLAIM FOR PRIORITY

This application makes reference to, incorporates the same herein, and claims all benefits accruing under 35 U.S.C. §119 from an application for *PERSONAL COMPUTER WITH AN OPTICAL SERIAL COMMUNICATION PORT* earlier filed in the Korean Industrial Property Office on the Apr. 15, 1997, and there duly assigned Serial No. 13724/1997, a copy of which application is annexed hereto.

BACKGROUND OF THE INVENTION

1. Technical Field

The present invention relates to computer systems having optical communication interface ports and, more particularly, to personal computer systems with serial infrared ports which can communicate with other serial IR port-equipped devices.

2. Related Art

Recently, there has been a tremendous increase in the number of infrared-equipped devices, such as desktop computers, portable computers, personal digital assistants (PDAs), digital cameras, personal communications services (PCS) handsets, and the like. Much of the credit for the dramatic rise in the use of infrared technology is due to the Infrared Data Association (IrDA), a non-profit international standards organization that was founded in 1993. The IrDA is responsible for developing and promoting hardware and software protocol standards to the infrared communications links in computing communications, and electronics consumer devices.

IrDA's infrared standards are now accepted by computer and telecommunications hardware and software manufacturers worldwide. The IrDA serial infrared (SIR) physical layer link specification Versions 1.0, 1.1 and 1.2 are provided to facilitate the point-to-point communication between infrared interface port-equipped electronic devices (e.g., computers and peripheral devices) using directed half duplex serial infrared communications links through free space. The documents specify the optical media interface, and 0.576 Mbps, 1.152 Mbps and 4.0 Mbps modulation and demodulation. They contain specifications for the Active Output Interface and the Active Input Interface, and for the overall link.

Many of recent computers and peripheral devices are equipped with an infrared communication feature that allows point-to-point communication, and almost all of them may include IrDA devices. Infrared is a form of invisible electromagnetic radiation that travels in wavelengths greater than those of visible light and shorter than those of microwaves. Just as television remote control which uses infrared waves to transmit user's control information to televisions, computers and peripheral devices use infrared waves to transmit user's control information. Examples of contemporary communication devices using infrared technology are disclosed in U.S. Pat. Nos. 5,099,346 and 5,247,380 for *Infrared Communication Network* issued to Lee et al., U.S. Pat. No. 5,416,627 for *Method And Apparatus For Two Way Infrared Communications* issued to Wilmoth, U.S. Pat. No. 5,564,020 for *Apparatus For Reducing Interference Between A Computer Device And A Radio Transceiver Utilizing Separated Units With An Infrared Link* issued to Rossi, U.S. Pat. No. 5,600,471 for *Optical Wireless Data Transmission System And Optical Wireless Data Transmitting/Receiving Apparatus* issued to Hirohashi et al., U.S. Pat. No. 5,636,264 for *Radio Telephone System Which Utilizes An Infrared Signal Communication Link* issued to Sulavuori, U.S. Pat. No. 5,668,977 for *Dockable Computer System Capable Of Electric And Electromagnetic Communication* issued to Swanstrom et al., and U.S. Pat. No. 5,682,379 for *Wireless Personal Local Area Network* issued to Mahany et al.

For computers and peripheral devices, infrared interface ports (i.e., infrared transceivers) are installed at respective devices, and infrared communications work best when an infrared interface port of the transmitting device is aligned within 15 degrees (up, down, left, or right) of an infrared interface port of the receiving device. As long as the transceiver is properly aligned within this 30 degrees cone, connectivity will occur at reasonable distances (e.g., about 3 meters). In practice, as I have observed however, it is extremely difficult to align the computers and peripheral devices within allowable link angle and distance. The problem is magnified for relatively heavy infrared-compatible desktop computers or printers with less mobility than portable computers since the infrared interface ports of the respective computers and peripheral devices are fixed to the housings, and the optical axes of the infrared interface ports are normal to the surface of the housings.

SUMMARY OF THE INVENTION

Accordingly, it is therefore an object of the present invention to provide infrared compatible computer systems and peripheral devices for efficient wireless infrared data communication over an infrared (IR) communication link.

It is also an object to provide a desktop computer using an adapter to support a flexible IR transceiver for easily alignment with a remote controller or peripheral devices within an allowable IR communication link angle.

It is further an object to provide a portable computer using an adapter to support a flexible IR transceiver for easily alignment with peripheral devices within an allowable IR communication link angle.

These and other objects of the present invention can be achieved by a computer system comprising a system unit having an infrared communication controller for controlling point-to-point communication with other infrared equipped devices; a keyboard socket built into a housing of the system unit and having at least two reserved pins; and an infrared transceiver electrically connected to said keyboard socket for communication with the infrared communication controller via the reserved pins. A detachable adapter with a plug at one distal end for mating with the keyboard socket is provided to support the infrared communication transceiver at an opposite distal end for infrared communications with other infrared equipped devices over an infrared communication link. The adapter can also be configured to include an extended socket at an opposite distal end for mating with an input cable for input devices, and the infrared communication transceiver extended from a central body by either a flexible tube or an extension cable for infrared communications with other infrared equipped devices over a communication link.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
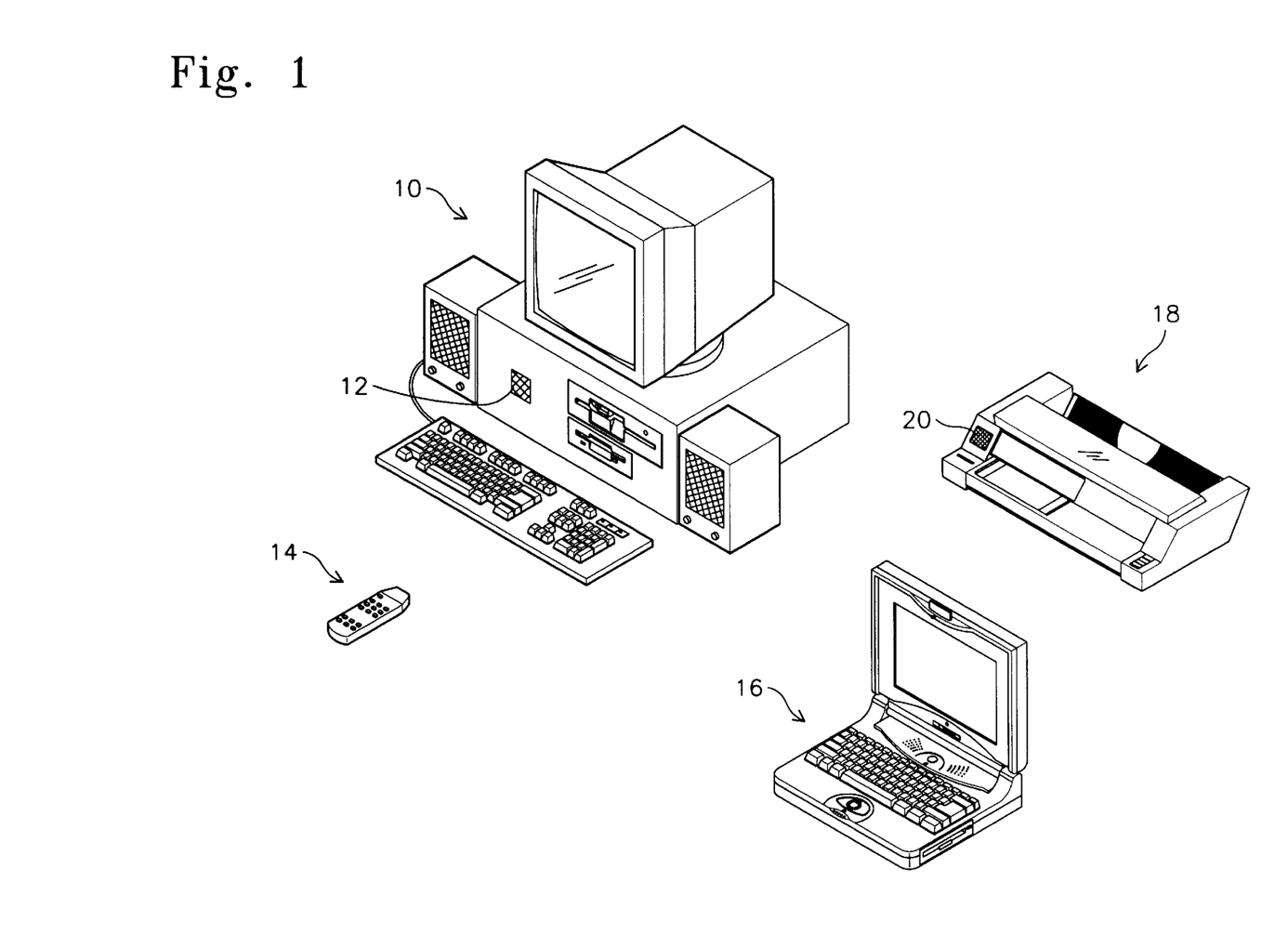
FIG. 1 is a perspective view of computer systems and peripheral devices equipped with serial optical communication ports.

Referring now to the drawings and particularly to FIG. 1, which illustrates computer systems such as a desktop computer 10 and a portable computer 16 with a remote controller 14, and peripheral devices such as a printer 18 equipped with IrDA devices such as infrared interface ports 12 and 20 which use infrared technology for communication. For desktop computer 10 and printer 18, which uses a remote controller 14, infrared interface ports 12 and 20 (i.e., infrared transceivers) are generally installed at the front of its housing.

In typical situations, as I have described, infrared communications work best when an infrared interface port of the transmitting device is aligned within 15 degrees (up, down, left, or right) of an infrared interface port of the receiving device. As long as the transceiver is properly aligned within the 30 degrees cone, connectivity will occur at reasonable distances (e.g., about 3 meters). In practice, as I have observed however, it is extremely difficult to align the computers and peripheral devices within allowable link angle and distance. The problem is compounded for relatively heavy infrared-compatible desktop computers or printers with less mobility than portable computers since the infrared interface ports of the respective computers and peripheral devices are fixed to the housings, and the optical axes of the infrared interface ports are normal to the surface of the housings.

Figure 2:
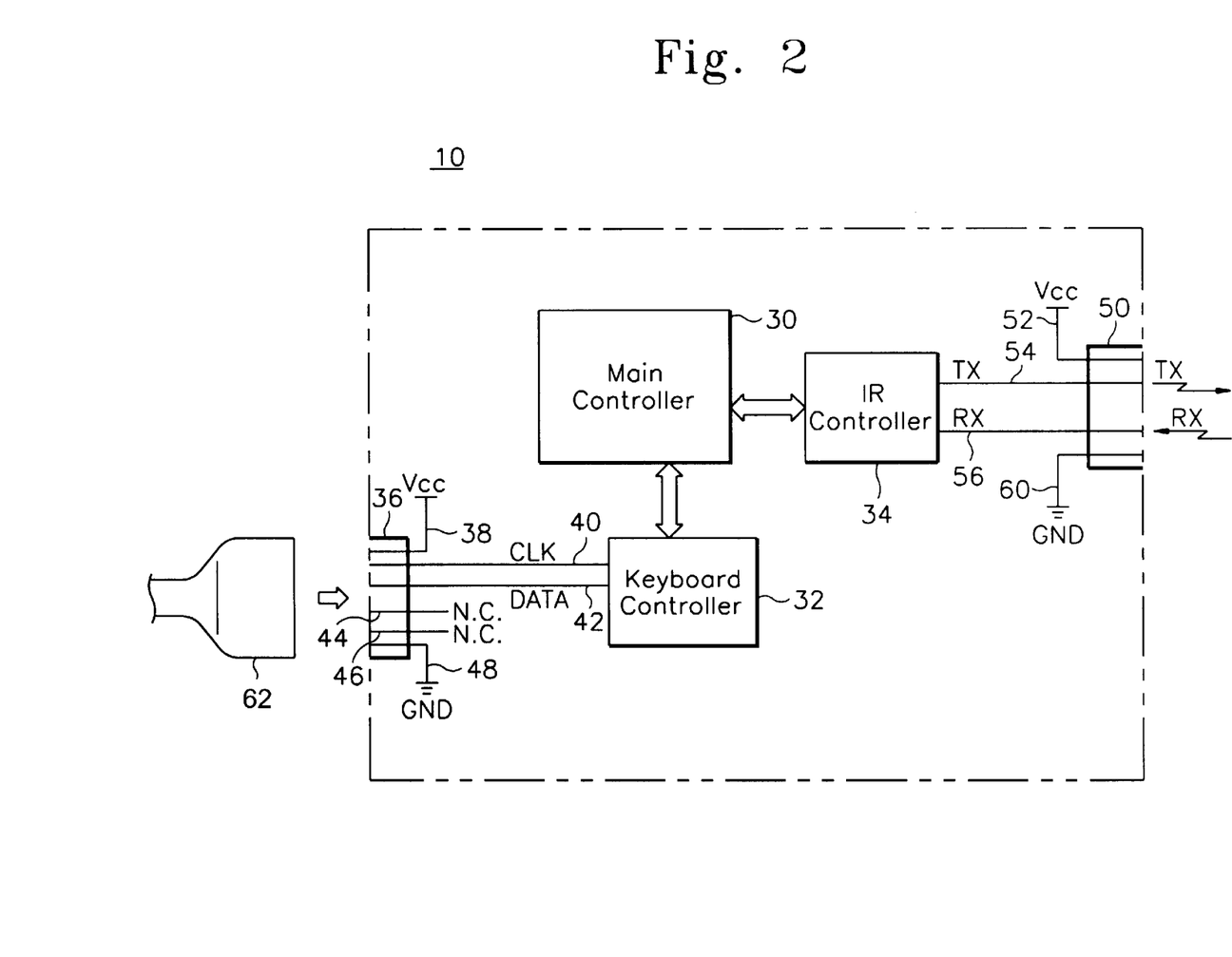
FIG. 2 is a schematic block diagram of an infrared-compatible desktop computer as shown in FIG. 1.

FIG. 2 is a schematic block diagram of a system unit of an exemplary infrared-equipped desktop computer. The system unit 10' of the desktop computer includes a main controller 30 such as a central processing unit (CPU), a keyboard controller 32, an infrared ("IR") controller 34, a keyboard port or socket 36, and IR port or transceiver 50. The IR controller 34 and IR transceiver 50 are connected by two data signal lines 54 and 56. The IR transceiver 50 is supplied with a power supply voltage Vcc and ground voltage GND via power and ground lines 52 and 60 respectively.

Recent IBM PS/2 compatible computer has a 6-pin miniature DIN modular keyboard connector for connection with a keyboard. According to PS/2 keyboard wiring scheme, only four pins are significant to keyboard use: pin one (42) is assigned keyboard data DATA; pin three (48) is connected to ground; pin four (38) is connected to a power terminal Vcc of five volts; and pin five (40) is connected to a keyboard clock CLK. Pins two and six (44 and 46) are reserved, and the shield is attached as a chassis ground. Input cable 62 of a PS/2 compatible input device such as keyboard, mouse, keypad, or the like is plugged into the PS/2 type socket 36. In this computer system, the infrared interface port 50 (i.e., IR transceiver) is installed at the front of the main unit housing for infrared communications with peripheral devices, and the PS/2 type socket 36 is installed at the rear of the main unit housing for cable connection with the keyboard.

Figure 3:
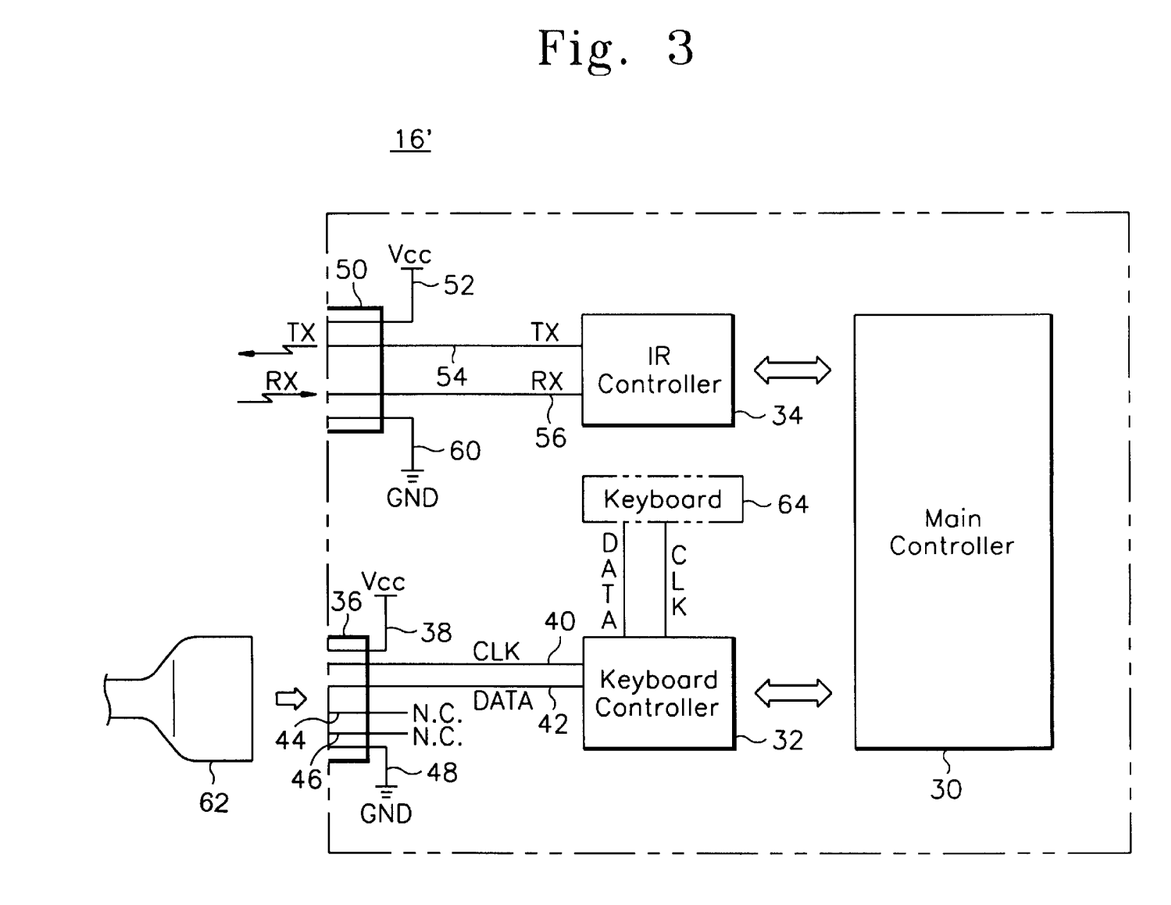
FIG. 3 is a schematic block diagram of an infrared-compatible portable computer as shown in FIG. 1.

FIG. 3 is a schematic block diagram of a system unit of an exemplary infrared-equipped portable computer. The system unit 16' of the portable computer has the same configuration as that of the desktop computer 10' of FIG. 2 except that a keyboard 64 is integrated with the system and is directly connected with the keyboard controller 32. The portable computer 16' also includes a PS/2 type socket 36 for connecting external PS/2 compatible devices. The infrared interface port 50 (i.e., IR transceiver) and the PS/2 type socket 36 are installed at the front of the main unit housing for infrared communications with peripheral devices.

Figure 4:
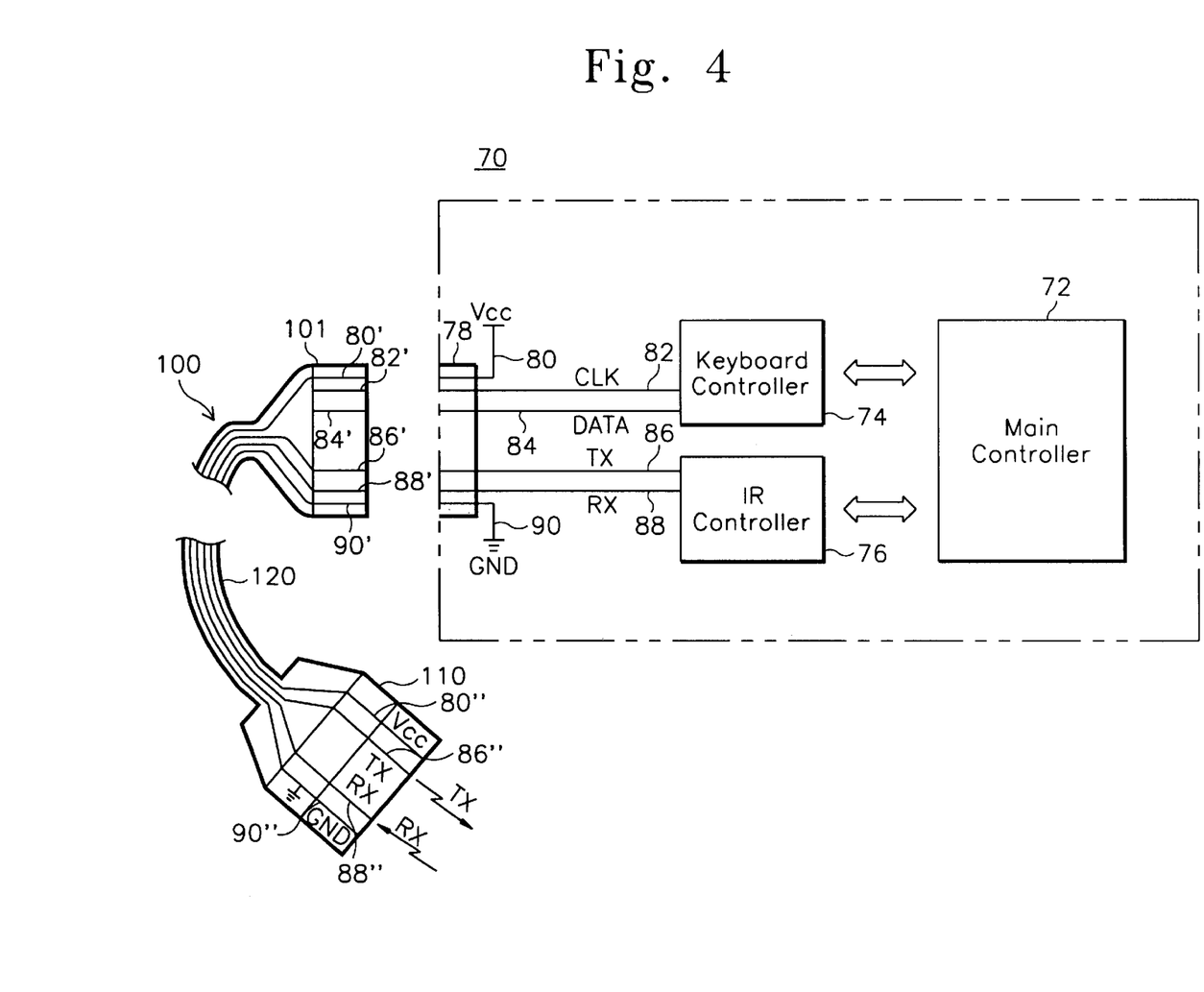
FIG. 4 is a schematic block diagram of a computer system using an adapter to support a flexible IR transceiver according to a first embodiment of the present invention.

Turning now FIGS. 4 to 9 which are schematic block diagrams of alternative embodiments of a computer system according to the present invention. First, referring to FIG. 4 which illustrates an exemplary computer system using a detachable adapter 100 to support a flexible IR transceiver 110 for easily alignment with a remote controller or other infrared-equipped devices (e.g., computers, peripheral devices, digital cameras, etc.) within an allowable IR communication link angle. As shown in FIG. 4, the system unit 70 of the computer system includes a main controller 72 in communication with a keyboard controller 74 and an infrared IR controller 76. The keyboard controller 74 and the IR controller 76 are electrically connected to a 6-pin keyboard socket 78 for accommodating insertion of a plug 101 of an externally equipped IR transceiver 110 for infrared communications with other infrared-equipped devices (e.g., computers, peripheral devices, digital cameras, etc.) over an infrared (IR) communication link.

The detachable adapter 100 has a plug 101 at one distal end that can be fitted into the 6-pin keyboard socket 78 of the system unit 70, and an external IR transceiver 110 at an opposite distal end for transmitting and/or receiving infrared communications with the keyboard and/or peripheral devices. The plug 101 and the transceiver 110 are electrically connected with each other by a connection member 120 (i.e., flexible cable). Plug pins 86' and 88' serve to electrically connect the data lines 86" and 88" of the IR transceiver 110 with the lines 86 and 88 of the IR transceiver controller 76, respectively. Pins 80' and 90' serve to electrically connect the IR transceiver 110 to power and ground terminals with voltages Vcc and GND via the adapter 100. The IR transceiver 110 is not connected with the keyboard controller 74.

Figure 5:
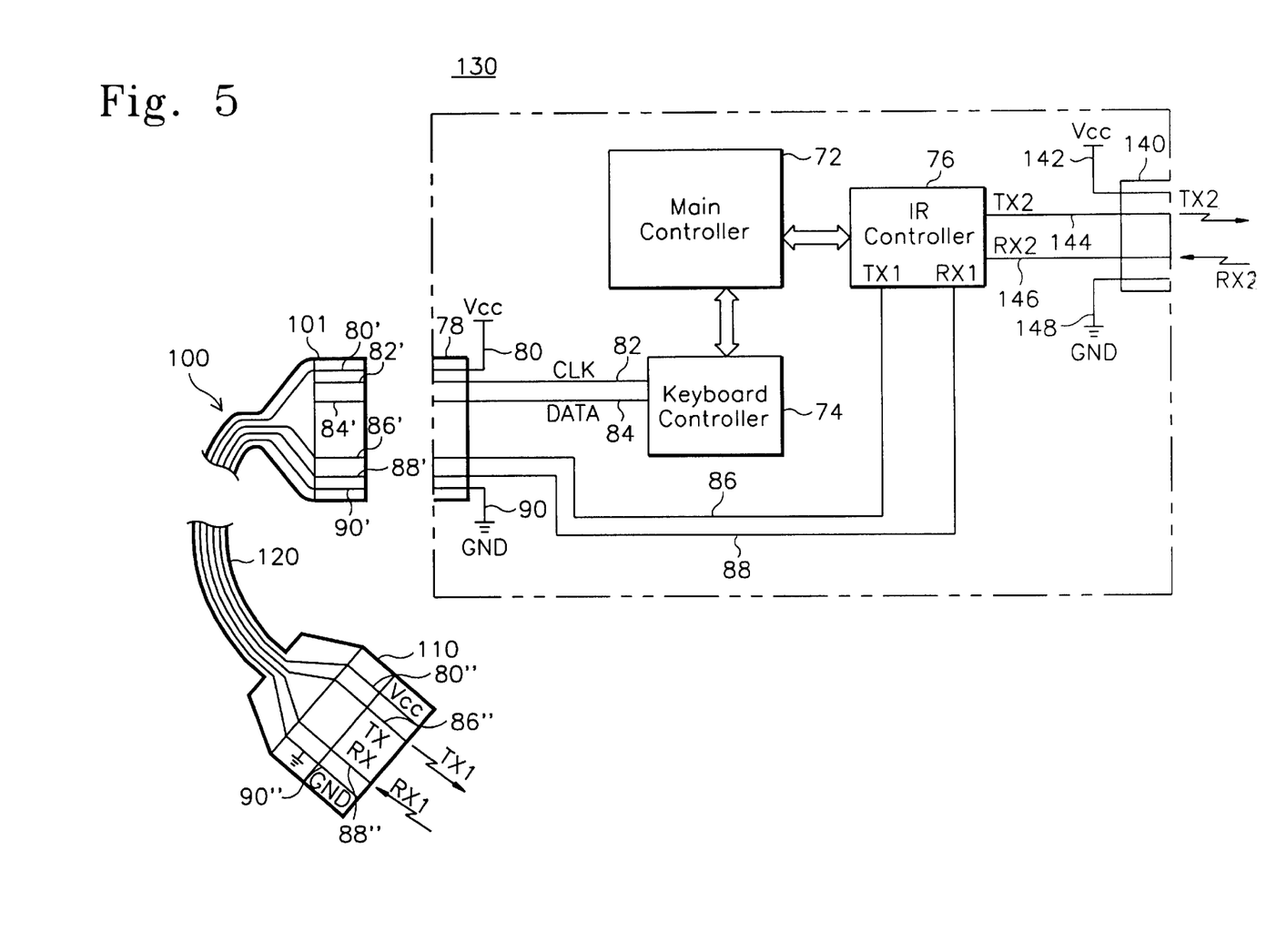
FIG. 5 is a schematic block diagram of a desktop computer using an adapter to support a flexible IR transceiver according to the first embodiment of the present invention.

FIG. 5 is a schematic block diagram of a desktop computer using an adapter to support a flexible IR transceiver according to a preferred embodiment of the present invention. A system unit 130 of the desktop computer includes a main controller 72, a keyboard controller 74 and an IR controller 76. The IR controller 76 is electrically connected to a built-in IR transceiver 140 installed at the front portion and a detachable adapter 100 which supports an external IR transceiver 110 via 6-pin socket 78 for infrared communications with other infrared-equipped devices (e.g., computers, peripheral devices, digital cameras, etc.) over an infrared (IR) communication link.

The detachable adapter 100 also has a plug 101 at one distal end that can be fitted into the 6-pin socket 78 of the system unit 70, and an external IR transceiver 110 at an opposite distal end for transmitting and/or receiving infrared communications with other infrared-equipped devices (e.g., computers, peripherals, digital cameras, etc.) over an infrared (IR) communication. The plug 101 and the transceiver 110 are electrically connected with each other by a connection member 120 (i.e., flexible cable). Plug pins 86' and 88' serve to electrically connect the data lines 86" and 88" of the IR transceiver 110 with the lines 86 and 88 of the IR transceiver controller 76, respectively. Pins 80' and 90' serve to electrically connect the IR transceiver 110 to power and ground terminals with voltages Vcc and GND via the adapter 100. The IR transceiver 110 is not connected to the keyboard controller 74, but is connected to the IR controller 76 which supports the built-in IR transceiver 140.

Figure 6:
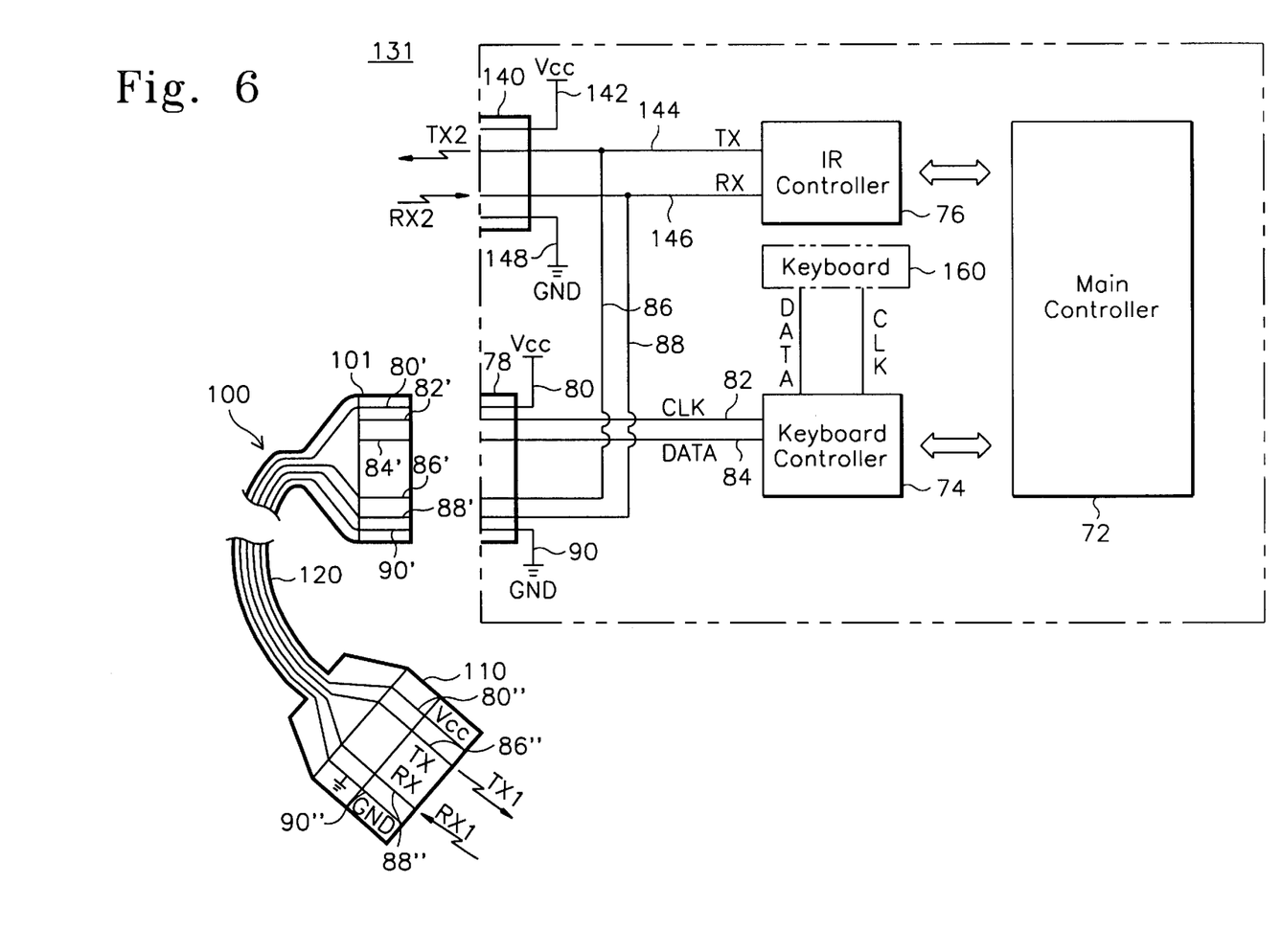
FIG. 6 is a schematic block diagram of a portable computer using an adapter to support a flexible IR transceiver according to the first embodiment of the present invention.

FIG. 6 is a schematic block diagram of a portable computer such as a laptop or a notebook computer using an adapter to support a flexible IR transceiver according to a preferred embodiment of the present invention. A system unit 131 of the portable computer includes a main controller 72 electrically connected to a keyboard controller 74 and an IR controller 76. The keyboard controller 74 is electrically connected to a keyboard 160 integrated thereon. The IR controller 76 is electrically connected to a built-in IR transceiver 140 installed at the front portion of the portable computer and a detachable adapter 100 installed to support an external IR transceiver 110 via 6-pin socket 78 for infrared communications with other infrared-equipped devices (e.g., computers, peripheral devices, digital cameras, etc.) over an infrared (IR) communication link.

Likewise, the detachable adapter 100 has a plug 101 at one distal end that can be fitted into the 6-pin socket 78 of the system unit 70, and an external IR transceiver 110 at an opposite distal end for transmitting and/or receiving infrared communications with other infrared-equipped devices (e.g., computers, peripherals, digital cameras, etc.) over an infrared (IR) communication link. The plug 101 and the transceiver 110 are electrically connected with each other by a connection member 120 (i.e., flexible cable). Plug pins 86' and 88' serve to electrically connect the data lines 86" and 88" of the IR transceiver 110 with the lines 86 and 88 of the IR transceiver controller 76, respectively. Pins 80' and 90' serve to electrically connect the IR transceiver 110 to power and ground terminals with voltages Vcc and GND via the adapter 100. The built-in IR transceiver 140 is directly connect to an IR controller 76. The external IR transceiver 110 is connected to the IR controller 76 via the PS/2 type adapter 100 and socket 78.

Figure 7:
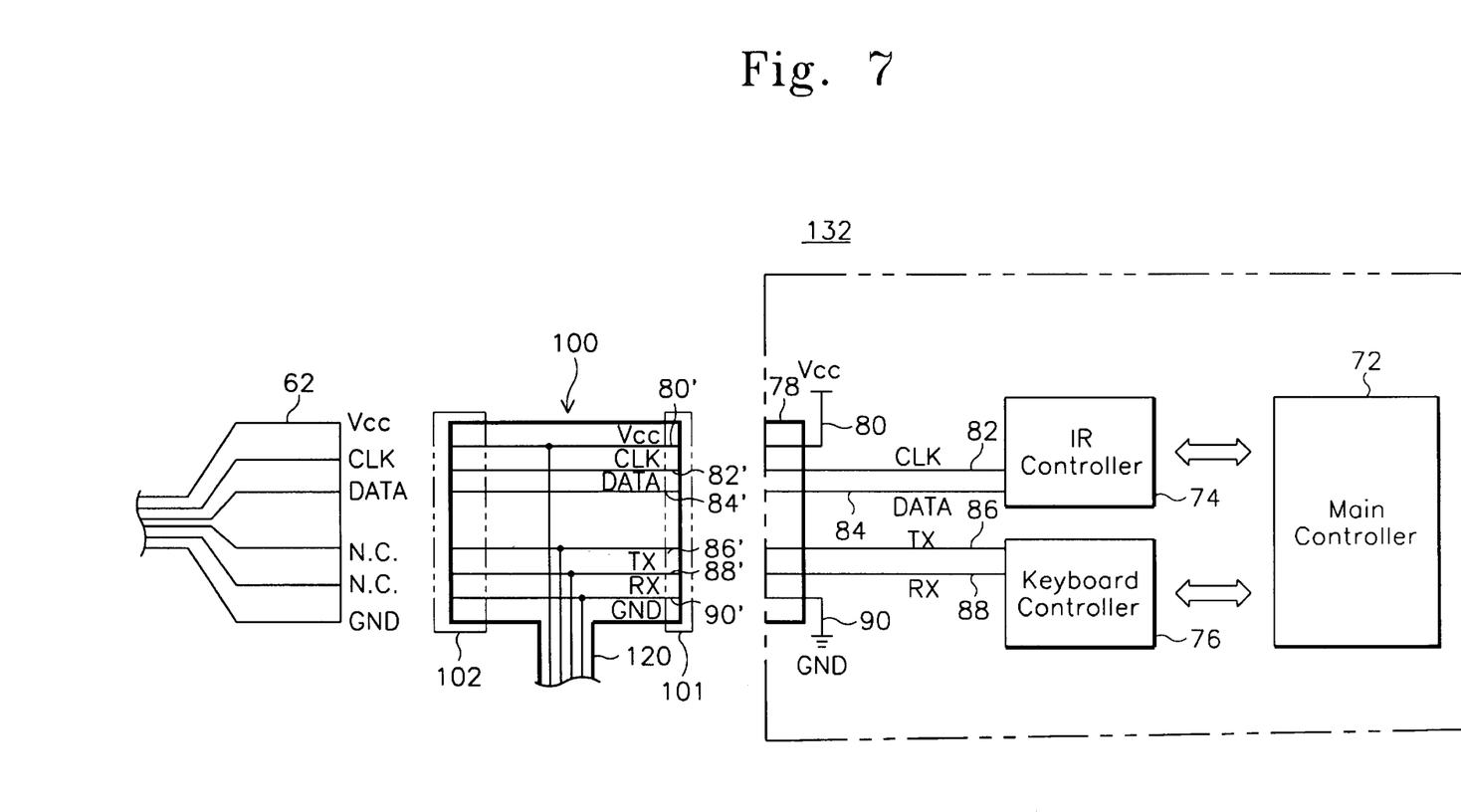
FIG. 7 is a schematic block diagram of a computer system using an adapter to support a flexible IR transceiver and a compatible cable of input devices according to a second embodiment of the present invention.

FIG. 7 is a schematic block diagram of a computer system according to a second embodiment of the present invention. A system unit 132 of the computer system includes the same main controller 72, the IR controller 74 and the keyboard controller 76. However, a PS/2 type port or socket 78 is used for serial infrared (SIR) point-to-point communication. In addition, a detachable adapter 100 is constructed with a plug 101 at one distal end for mating with a PS/2 type socket 78, and a duplicated PS/2 type socket (i.e., receptacle) 102 at an opposite distal end for mating with an input cable 62 for input devices such as keyboard, mouse, or keypad. An IR transceiver 110 is extended from the body of the adapter by a flexible cable 120, and is controlled by the IR controller 76 for infrared serial communications with other infrared-equipped devices (e.g., computers, peripherals, digital cameras, etc.) over an infrared (IR) communication link. The external IR transceiver 110 may be built with one or more built-in IR transceivers if necessary. The adapter 100 provides the simultaneous connection of an external IR transceiver and an input PS/2 compatible device to the system unit 132.

Figure 8:
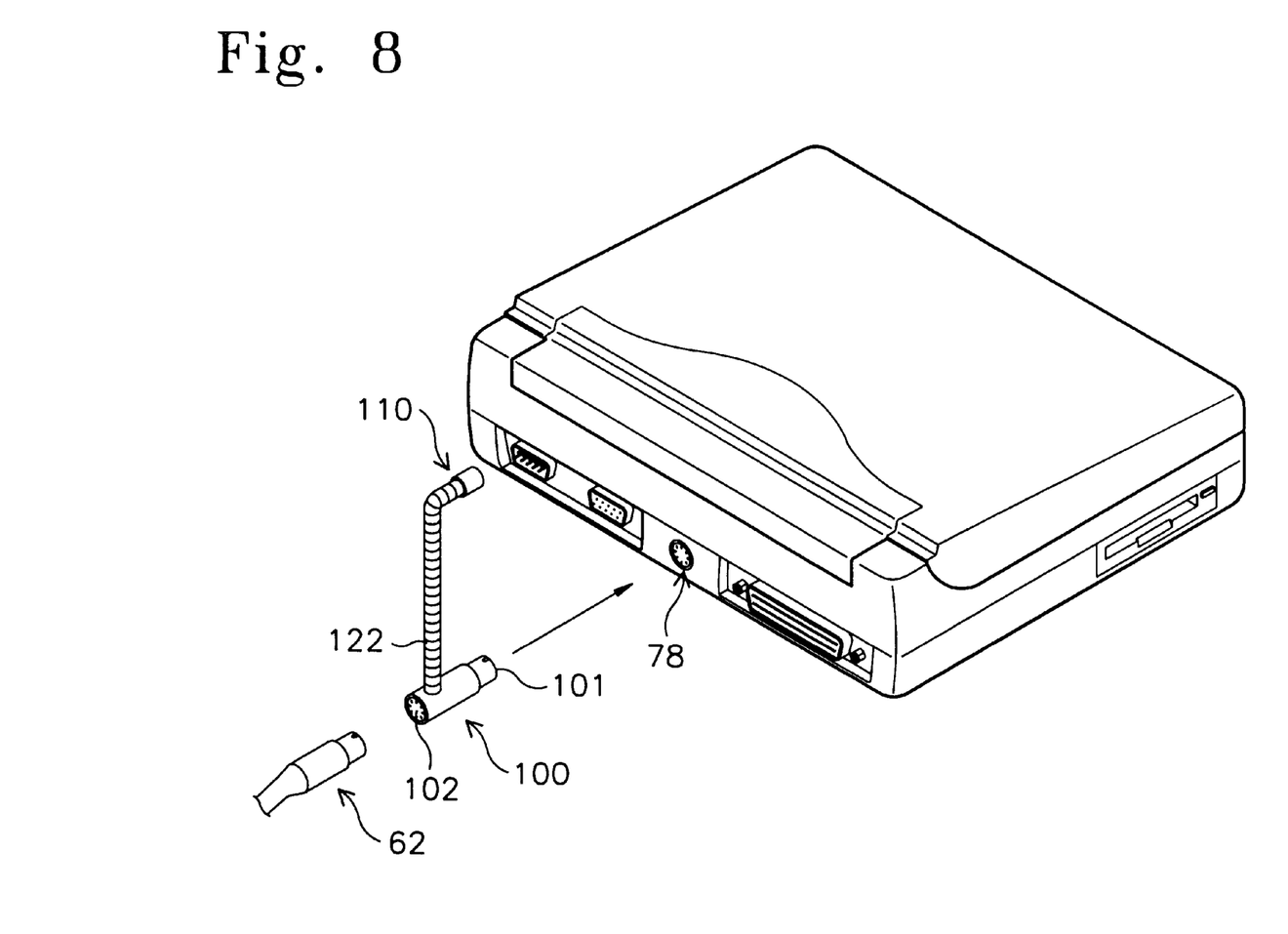
FIG. 8 is a perspective view of a portable computer using an adapter to support a flexible IR transceiver and a compatible cable of input devices according to the second embodiment of the present invention.

FIG. 8 is a perspective view of a portable computer using an adapter 100 to support a flexible IR transceiver 10 and a compatible cable of input devices according to the second embodiment of the present invention. The adapter 100 has a plug 101 at one distal end formating with a PS/2 type socket 78 of the portable computer, and a duplicated PS/2 type socket (i.e., receptacle) 102 at an opposite distal end for mating with an input cable 62 for input devices such as keyboard, mouse, or keypad. In addition, the adapter 110 also includes a flexible tube 122 for sustaining the IR transceiver 110. The transceiver 110 is electrically connected with the reserved pins of the adapter 100 by conductive lines inside the tube 122. The use of such a flexible tube 122 provides the flexibility of inter-IR device alignment because it is then possible to easily adjust the optical axis direction of the IR transceiver according to circumstances.

Figure 9:
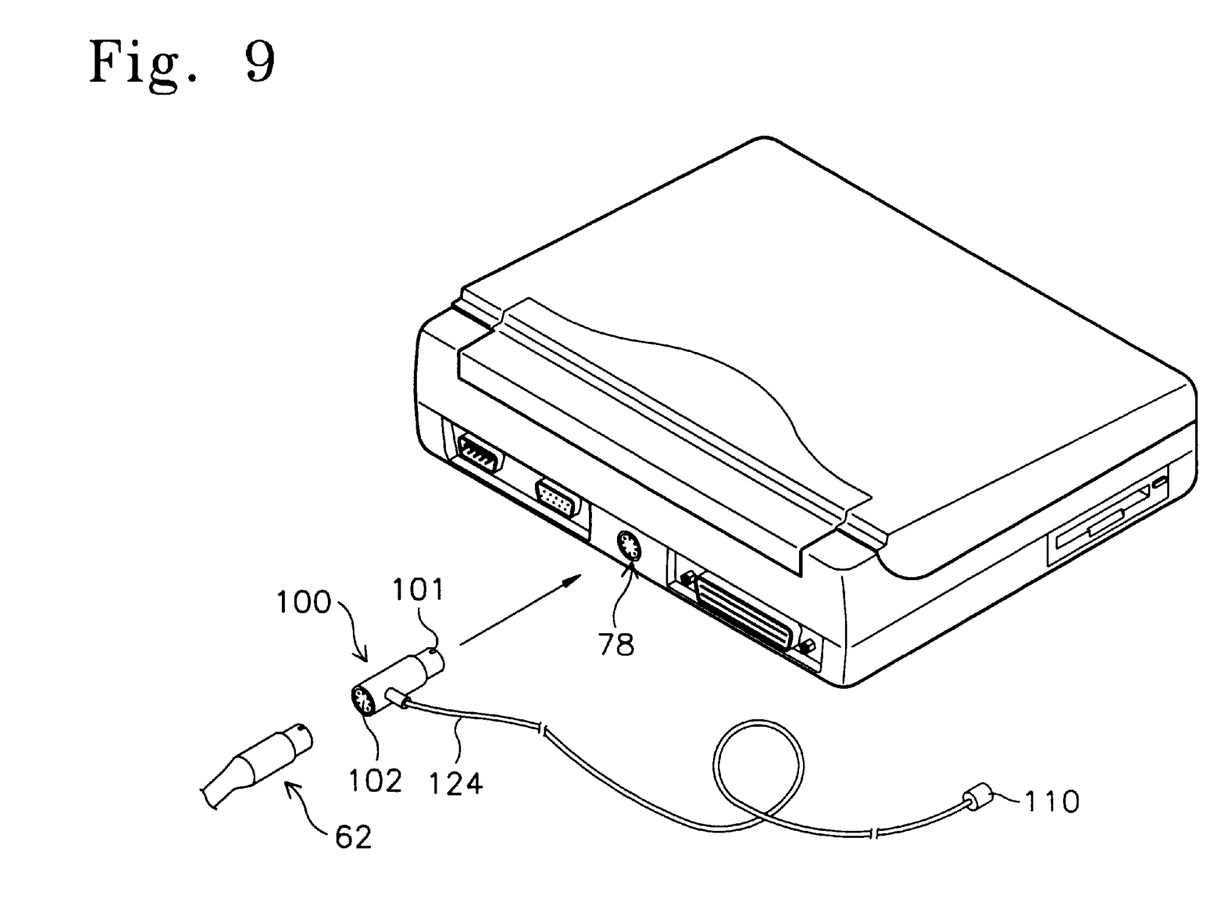
FIG. 9 is a perspective view of a portable computer using an adapter to support a flexible IR transceiver and a compatible cable of input devices according to the second embodiment of the present invention.
Figure 10:
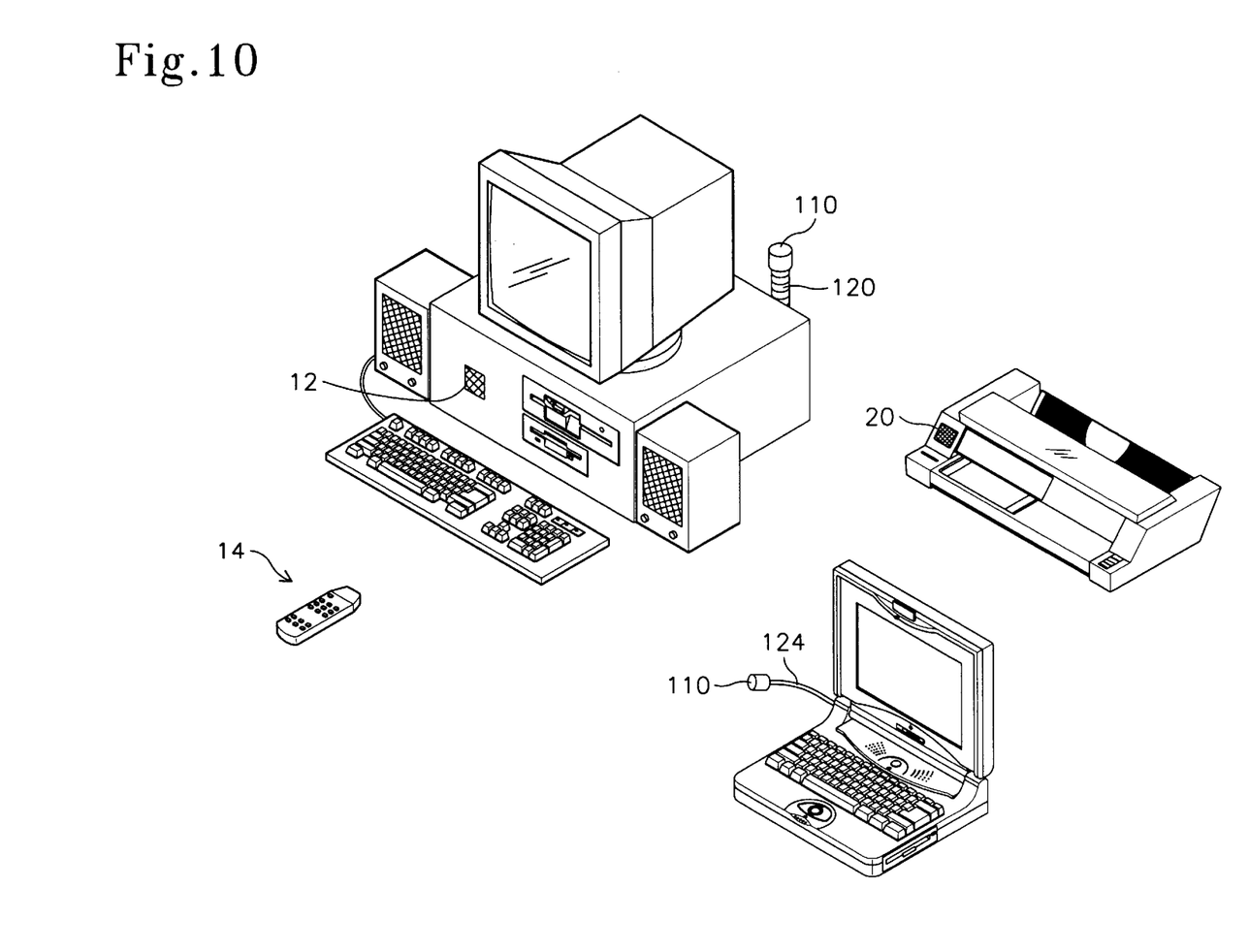
FIG. 10 is a perspective view of computer systems and peripheral devices equipped with serial optical communication ports according to the principles of the present invention.

FIG. 9 is a perspective view of a portable computer using an adapter 100 to support a different type of IR transceiver 110 and a compatible cable of input devices according to the second embodiment of the present invention. In this configuration, the IR transceiver 110 and the adapter 100 are electrically connected with each other by an extension cable 124 instead of a flexible tube 122 as shown in FIG. 8. This configuration allows the computer system and other infrared-equipped devices (e.g., computers, peripherals, digital cameras, etc.) be aligned with less restriction of link angle and distance, as shown in FIG. 10.

As described above, according to the present invention, all communication difficulties experienced by infrared equipped communication devices such as computer systems due to the restriction of allowable link angle, link distance, and various communication obstacles can be avoided.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A computer system, comprising:
a system unit having an optical serial communication controller for controlling point-to-point communication with other optical port-equipped devices;
a keyboard socket built into a housing of said system unit and having at least two reserved pins; and
an optical communication transceiver electrically connected to said keyboard socket for communication with said optical communication controller via the reserved pins.

2. The computer system of claim 1, further comprising a detachable adapter having a plug at one distal end for mating with said keyboard socket, and said optical communication transceiver at an opposite distal end for serial communications with other optical port-equipped devices over a communication link.

3. The computer system of claim 1, further comprising a detachable adapter having a plug at one distal end for mating with said keyboard socket, an extended socket at an opposite distal end for mating with an input cable for input devices, and said optical communication transceiver extended from a central body by a flexible tube for serial communications with other optical port-equipped devices over a communication link.

4. The computer system of claim 1, further comprising a detachable adapter having a plug at one distal end for mating with said keyboard socket, an extended socket at an opposite distal end for mating with an input cable for input devices, and said optical communication transceiver extended from a central body by an extension cable for serial communications with other optical port-equipped devices over a communication link.

5. The computer system of claim 1, further comprised of said keyboard socket corresponding to a 6-pin miniature DIN modular socket.

6. The computer system of claim 2, further comprised of said optical communication transceiver and said optical serial communication controller correspond to serial infrared (SIR) communication transceiver and controller, respectively.

7. The computer system of claim 6, further comprised of said serial infrared (SIR) communication transceiver being electrically connected with said serial infrared (SIR) communication controller via the reserved pins of said keyboard socket.

8. A computer system, comprising:
a system unit having an optical serial communication controller for controlling point-to-point communication with other optical port-equipped devices;
a keyboard socket built into a housing of said system unit and having at least two reserved pins;
an adapter having a plug which is mated with said keyboard socket and a duplicated keyboard socket allowing a keyboard to be electrically connected with said system unit; and
an optical communication transceiver electrically connected with said optical communication controller through said adapter.

9. The computer system of claim 8, further comprised of said optical communication transceiver being electrically connected with said optical communication controller via the reserved pins of said respective keyboard sockets.

10. The computer system of claim 8, further comprised of said adapter having a flexible tube for physically supporting electrical connection of said optical communication transceiver with said optical communication controller by conductive lines inside said flexible tube.

11. The computer system of claim 8, further comprised of said optical communication transceiver and said adapter being electrically connected by an extension cable.

12. The computer system of claim 8, further comprised of said keyboard sockets each corresponding to a 6-pin miniature DIN modular socket.

13. The computer system of claim 8, further comprised of said optical communication transceiver and controller corresponding to serial infrared (SIR) communication transceiver and controller, respectively.

14. The computer system of claim 13, further comprised of said keyboard sockets each corresponds to a 6-pin miniature DIN modular socket.

15. The computer system of claim 13, further comprised of said serial infrared (SIR) communication transceiver being electrically connected with said serial infrared (SIR) communication controller via the reserved pins of said respective keyboard sockets.

16. The computer system of claim 13, further comprised of said adapter having a flexible tube for sustaining electrical connection of said serial infrared (SIR) communication transceiver with said serial infrared (SIR) communication controller by conductive lines inside said flexible tube.

17. A computer system, comprising:
a system unit having an infrared controller for controlling point-to-point communication with other infrared equipped communication devices via an infrared communication link;
a compatible socket built into a housing of said system unit;
an adapter having a plug which is mated with said compatible socket and an extended socket allowing input devices to be electrically connected with the system unit; and
an infrared transceiver extended from said adapter, and electrically connected with said infrared controller through said adapter by one of a flexible tube and an extension cable.

18. The computer system of claim 17, further comprised of said compatible socket and said extended socket corresponding to 6-pin miniature DIN modular sockets.

19. The computer system of claim 17, further comprised of said infrared transceiver being electrically connected with said infrared controller via reserved pins of said compatible socket and said extended socket.

20. The computer system of claim 18, further comprised of said infrared transceiver being electrically connected with said infrared controller via reserved pins of said 6-pin miniature DIN modular sockets respectively.

* * * * *